Sept. 27, 1938.  W. J. S. NAUNTON ET AL  2,131,255
MAKING SLIDE FASTENERS
Original Filed April 28, 1933
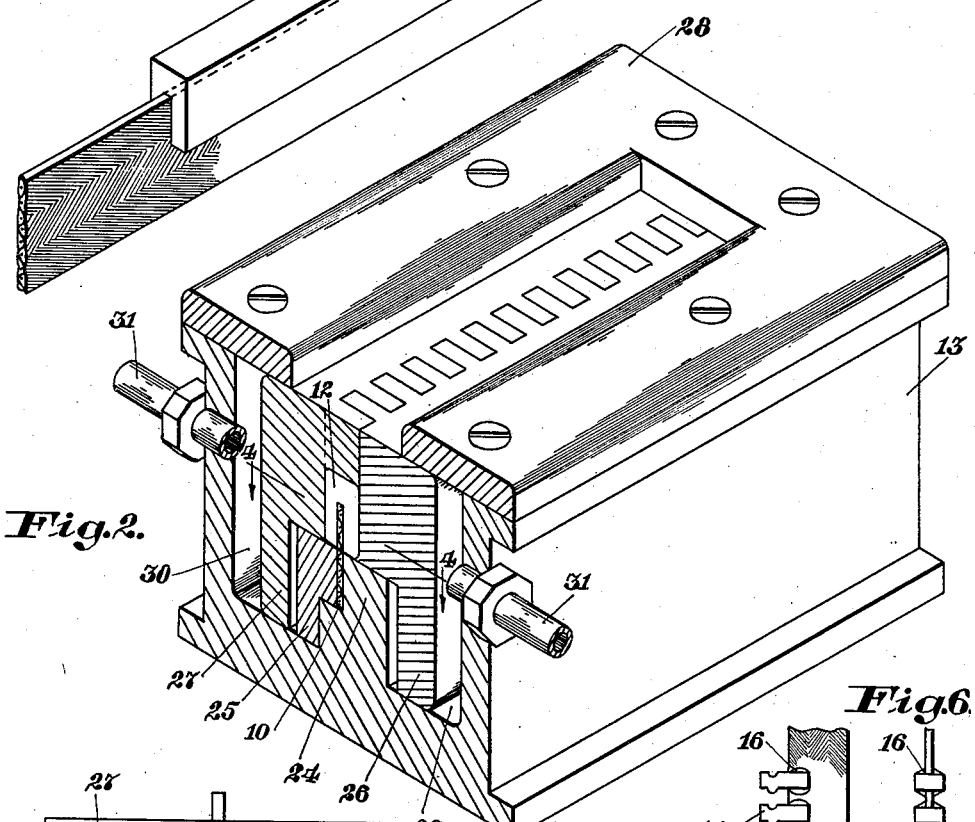
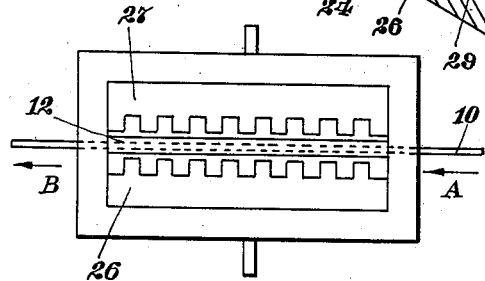
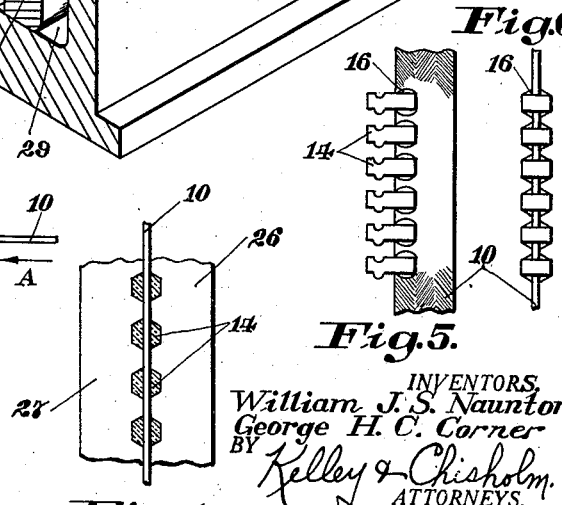
INVENTORS,
William J. S. Naunton
George H. C. Corner
BY Kelley & Chisholm
ATTORNEYS.

Patented Sept. 27, 1938

2,131,255

UNITED STATES PATENT OFFICE 2,131,255

MAKING SLIDE FASTENERS

William Johnson Smith Naunton, Manchester, and George Henry Clifford Corner, Birmingham, England, assignors to Talon, Inc., a corporation of Pennsylvania Application April 28, 1933, Serial No. 668,412. Renewed January 26, 1938. In Great Britain May 3, 1932

4 Claims. (Cl. 18—59)

This invention relates to slide fasteners of the type in which a pair of flexible stringers is provided along their adjacent edges with interlocking elements, which are interlocked to close the fastener and released to open the fastener by a slider movable along the stringers, as exemplified in the patent to Sundback 1,219,881.

It has heretofore been proposed, for example in the British patent to Hora 361,092, to simultaneously form to finished shape and attach to the edges of the stringers a number of interlocking elements. At one stage of this process the interlocking elements are all connected by a web or gate of the material of which they are formed, and this must be removed before the fastener is finished. This is not only expensive operation but it produces imperfectly formed interlocking elements and objectionably wastes material, especially where using thermo-hardening resins which can not be remelted and used again.

One of the objects of this invention is to provide a process for making fasteners, especially adapted but not limited to plastic material, which enables fasteners to be cheaply and rapidly produced without waste of raw material.

Another object of the invention is to make fasteners in such a way that each interlocking element is perfectly formed without interfering webs or fins of material. More specifically, it is an object to facilitate molding of a number of interlocking elements by conveniently and economically supplying to the mold the correct amount of material required.

In carrying out the invention, we cast or mold a bar of any suitable material, for example metal or plastic resin to the edge of the fabric tape and in a separate operation press or mold the bar into the individual interlocking elements.

In the accompanying drawing:

Fig. 1 is a perspective view of a bar applied to a tape at one step of the process.

Fig. 2 is a perspective view of a section of a die for carrying out one step of the process.

Fig. 3 is a plan of the die shown in Fig. 2.

Fig. 4 is a sectional view of the die on the line 4—4 of Fig. 2.

Fig. 5 is a side view of a finished fastener.

Fig. 6 is an edge view of a fastener as taken from the die shown in Fig. 2.

In carrying out the process, a fabric tape 10 is first placed with its edge projecting into a simple two-piece mold, not shown, and an exact amount of material formed into a bar 12 secured to the edge of the tape. The material may be molten metal (suitably flowed in the absence of oxygen and rapidly chilled to prevent damage to the tape), or any suitable molding powder, liquid, or plastic material, such as pyroxylin, synthetic phenolic resins, and the like. The amount of material formed into the bar is as nearly as practical the exact amount required for a predetermined number of individual interlocking elements. To insure molding of the exact amount an excess may be used, the mold being constructed to allow the excess to escape at one end, where the resulting fin may be economically and readily removed leaving the exact amount required in the bar. After forming, the bar, attached to the tape, is removed from the mold. It will be appreciated that the particular casting or molding process used and the temperature of the mold and the amount of pressure applied will be dependent upon the material selected.

At the next step, the tape and bar are placed in the second mold 13, conveniently of the form shown in Fig. 2, which separates the bar into individual bodies and presses the bodies into a plurality of individual interlocking elements. In this also the temperature of the mold and the amount of pressure applied will be dependent upon the material used. Since the amount of material in the bar 12 is exactly equivalent to that required by the elements, no waste or fins remain between the elements except that some of the material may be pressed into the tape, as indicated at 16, Figs. 5 and 6. This amount of material is negligible, constituting an extremely thin layer, which is shown in exaggerated proportions in Fig. 6, for the sake of clearness. It does not interfere with the operation of the fastener except that it may render the stringer less flexible than may be desired in some instances. The desired flexibility may be attained either by passing the stringer through a flexing machine, of the type shown by Sundback Patent 1,857,669, or the stringers may be tumbled in any suitable known apparatus not shown. A quantity of stringers is placed in a tumbling barrel with a relatively large amount of steel balls and the barrel rotated so as to repeatedly flex the tapes. The thin web between the interlocking elements is broken up and disengaged from the tape in the form of small particles or dust, continuously removed by a blast of air through a suitable nozzle.

Referring to Fig. 2, the mold 13 has a fixed jaw piece 24 and an adjustable jaw piece 25. The tape 10 is placed between these jaws and they are brought together by external means (not shown) to hold the tape firmly in the press. The bar 12 projects above the top of the jaw pieces 24 and 25 and the specially shaped press jaws 26 and 27 are pressed against the material to squeeze it into interlocking elements of fastener members. The top of the press has a frame-shaped cover plate 28 held in position by screws. Through the opening in this frame the operator can see that the strips are in the correct position before the tape gripping and press jaws are closed. Any number of strips of the kind shown in Fig. 1 can be joined together and threaded through from one side of the press to the other as indicated by arrows A and B in Fig. 3.

The portion of the press jaws immediately above the work is shaped in a zigzag fashion and these parts fit tightly into one another so that no material can escape when the material is subjected to pressure. The spaces 29 and 30 are connected to a hydraulic ram by means of pipes 31 to supply pressure to force the dies together, and springs (not shown) part the press jaws when the hydraulic pressure is released. In Fig. 2 the press jaws are closed and in Fig. 3 they are open and the strip is in readiness for pressing. The press may be heated electrically or by steam and for certain plastic materials it may be desirable to provide water cooling so that a large amount of work can be turned out in a given time.

Fig. 4 is a section through the press showing the shape of the press jaws. The material is squeezed into separate bodies, each forming a fastener member 14.

This method of molding the bar precisely adjusts the amount of material contained in the bar to the exact amount required by a predetermined number of interlocking elements. The subsequent forming operation presses all of the material from the spaces between the interlocking elements into the cavities in the dies which form the interlocking elements. Thus each cavity is completely filled and there is no excess. This forms substantially perfect interlocking elements without the waste of any appreciable amount of material.

While we have shown and described in this application embodiments which our invention may assume in practice, it will be understood that these embodiments are merely for the purpose of illustration and description and that various other forms may be devised within the scope of our invention as defined in the appended claims.

What we claim as our invention is:—

1. The method of making slide fasteners of the type having a flexible carrier and a plurality of attached interlocking elements which consists in attaching a bar of material capable of being softened by the application of heat to the edge of a flexible carrier, and thereafter applying heat to and molding the bar into a plurality of individual interlocking elements secured to and uniformly spaced apart on the edge of said carrier.

2. The method of making slide fasteners of the type having a flexible carrier and a plurality of attached interlocking elements which consists in molding a bar of material capable of being softened by the application of heat on the edge of a flexible carrier, and thereafter applying heat to and molding the bar into a plurality of individual interlocking elements secured to and uniformly spaced apart on the edge of said carrier.

3. The method of making slide fasteners of the type having a flexible carrier and a plurality of attached interlocking elements which consists in molding a bar of material capable of being softened by the application of heat on the edge of a flexible carrier, thereafter applying heat to and molding the bar into a plurality of individual interlocking elements secured to and uniformly spaced apart on the edge of said carrier, and then repeatedly flexing the tape to remove excess material from the spaces between the elements.

4. The method of making slide fasteners of the type having a flexible carrier and a plurality of attached interlocking elements which consists in placing a bar of plastic material in contact with a flexible carrier and thereafter molding the bar into a series of individual interlocking elements secured to and uniformly spaced apart on said carrier.

WILLIAM JOHNSON SMITH NAUNTON.
GEORGE HENRY CLIFFORD CORNER.